United States Patent
Fremerey et al.

[11] Patent Number: 6,118,200
[45] Date of Patent: Sep. 12, 2000

[54] MAGNETIC BEARING

[75] Inventors: Johan K. Fremerey, Bonn; Stephan Polachowski, Julich; Heinrich Reiff, Niederzier, all of Germany

[73] Assignee: Forschungszentrum Jülich GmbH, Jülich, Germany

[21] Appl. No.: 09/068,643
[22] PCT Filed: Nov. 19, 1996
[86] PCT No.: PCT/DE96/02229
    § 371 Date: May 11, 1998
    § 102(e) Date: May 11, 1998
[87] PCT Pub. No.: WO97/19273
    PCT Pub. Date: May 29, 1997

[30] Foreign Application Priority Data

Nov. 24, 1995 [DE] Germany .......................... 195 43 745

[51] Int. Cl.⁷ .................................................. F16C 39/06
[52] U.S. Cl. ........................................ 310/90.5; 310/51
[58] Field of Search ........................ 310/90.5, 51

[56] References Cited

U.S. PATENT DOCUMENTS 5,521,448  5/1996  Tecza et al. ........................... 310/90.5

FOREIGN PATENT DOCUMENTS

| | | |
|---|---|---|
| 0 396 849 | 11/1990 | European Pat. Off. . |
| 2 253 950 | 7/1975 | France . |
| 1 441 194 | 12/1968 | Germany . |
| 2 314 436 | 12/1977 | Germany . |
| 60-125414 | 7/1985 | Japan . |

OTHER PUBLICATIONS

L.E. MacHattie, "The Production of High Rotational Speed", The Review of Scientific Instruments, vol. 12, No. 9 (Sep. 1941), pp. 429–435.

J.W. Beams, "Double Magnetic Suspension", The Review of Scientific Instruments, vol. 34, No. 10 (Oct. 1963), pp. 1071–74.

*Primary Examiner*—Nestor Ramirez
*Assistant Examiner*—Burton Mullins
*Attorney, Agent, or Firm*—Frishauf, Holtz, Goodman, Langer & Chick, P.C.

[57] ABSTRACT

A magnetic bearing for contactless support of a rotor in relation to a stator, with at least one bearing gap between rotor and stator, in which magnetic zones of rotor and stator, appropriately designated rotor magnet and stator magnet, respectively, are disposed facing each other a short distance apart. The stator magnet is fixed to the stator in such a way that it can vibrate freely in substantially one plane, which is aligned parallel to the magnet faces of the rotor and stator magnets facing each other in the bearing gap. In this arrangement, a mechanical friction device is disposed between the stator and stator magnet to damp the vibrational movement of the stator magnet.

11 Claims, 1 Drawing Sheet

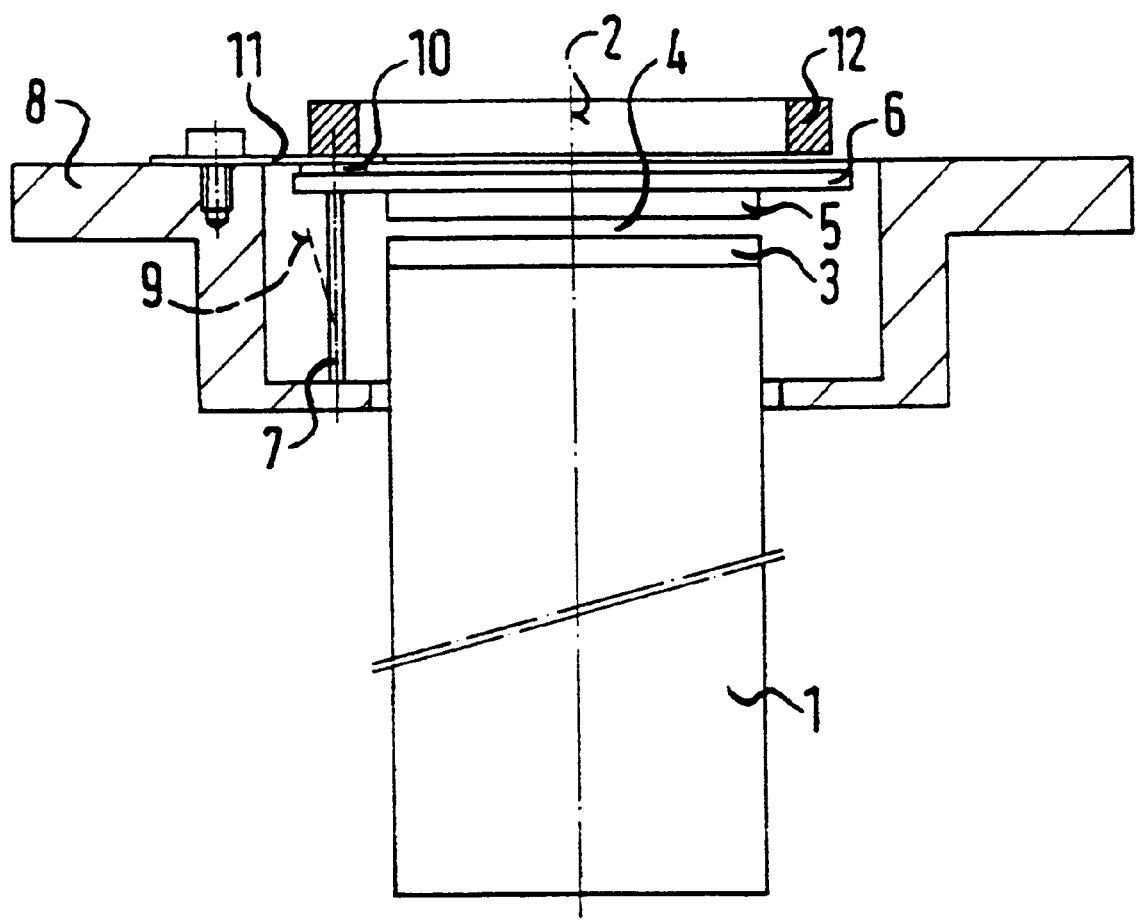

MAGNETIC BEARING

FIELD OF THE INVENTION

The invention relates to a magnetic bearing for contactless support of a movable, preferably rotating body in relation to a fixed part. Hereinafter the movable body is called "rotor" and the fixed part "stator". Rotor and stator are provided with magnetic zones, appropriately designated rotor and stator magnet respectively, which are disposed facing each other a short distance apart in at least one bearing gap of the magnetic bearing. The stator magnet is fixed to the stator in such a way that it can vibrate freely relative to the stator in substantially one plane, which is aligned parallel to the magnet faces of rotor and stator magnet facing each other in the bearing gap.

BACKGROUND OF THE INVENTION

Magnetic bearings of this type are known. In a magnetic bearing described by McHattie, see Review of Scientific Instruments, Vol. 12, pp. 429–435, 1941, with which small rapidly rotating steel cylinders are suspended contactlessly and which is equipped with axially active electromagnetic stabilization, radial vibrations of the suspended rotor are transmitted by contactless magnetic coupling to a radially movably mounted needle and damped by partial immersion of the needle in oil. Oil damping is also specified by J. W. Beams in "Double Magnetic Suspension", Review of Scientific Instruments, Vol. 34, pp. 1071–1074, 1963.

Disadvantages of this damping system are the necessary encapsulation of the movably mounted stator part to prevent oil losses, the additional assembly volume of the device necessitated by the encapsulation, and the associated relatively high manufacturing costs. As a component of mass-produced magnetic-bearing systems intended to compete directly with cost-optimized roller-bearing systems, especially in the use of such bearings for textile spindles and centrifuges, the oil damper appears to be unfavorable because of its manufacturing cost alone. Furthermore, because of circulation of part of the oil mass, the characteristics of an oil damper correspond only within limits to the characteristics of an ideal vibration damper with damping force proportional to speed, since mass acceleration forces caused by the oil circulation also become active in addition to the pure damping force.

SUMMARY OF THE INVENTION

The object of the invention is to equip a magnetic bearing with a damping system which leads to a small assembly volume and in which the circulation and coupled movement of considerable masses during damping can be largely reduced. It is also intended that the magnetic bearing will be inexpensive to manufacture.

This object is achieved in a magnetic bearing in accordance with the present invention. More specifically, a mechanical friction device is the vibrational movement of the stator magnet, which vibrates in a plane parallel to the magnet faces of the rotor and stator magnets. The friction device is preferably provided with two contact faces disposed in interlocking contact with each other, the normals to the faces thereof being oriented perpendicular to the plane of vibration of the stator magnet. During a deflection of the stator magnet, these contact faces slide along each other and damp the free vibrational movement of the stator magnet in proportion to the magnitude to which the frictional force, which controls the sliding of the contact faces over each other, is adjusted between the contact faces.

It is advantageous to provide one of the two contact faces with a smooth surface and the other with a rough surface. The smooth surface can be formed from rigid, especially metallic material, and the rough surface preferably from fabric, felt or other compliant material made from fibers.

For the purpose of adjusting a degree of damping to be made optimal for the respective application, the frictional force between the contact faces is adjustable. For this purpose, it is possible in particular to vary the pressing force between the contact faces.

It is provided in accordance with the invention that the rough surface is connected with the stator magnet, while a mechanical spring fixed in position on the stator but moving resiliently in substantially the direction of the normals to the surface of the contact face is used to form the smooth surface. The pressing force between the contact faces becomes greater the higher the pressure exerted by the spring on the smooth surface. Since the frictional force also increases with the pressing force, the achieved damping of the movement of the stator magnet also increases with increasing spring pressure. The frictional force and thus the damping is adaptable through adjustable initial tension of the spring.

Expediently, the simplest way to adjust the pressure between the contact faces is to use a leaf spring. The initial tension of the leaf spring can be generated by appropriate pressure on the resilient end of the leaf spring.

BRIEF DESCRIPTION OF DRAWINGS

The invention and further embodiments of the invention will be explained in more detail hereinafter on the basis of a practical example schematically illustrated in the drawing.

The drawing illustrates a longitudinal section of a rotationally symmetric magnetic bearing.

DETAILED DESCRIPTION OF THE PREFERRED EMBODIMENT

A rotor 1 of hollow cylindrical form with vertically disposed axis of rotation 2 is equipped at its top end with an annular rotor magnet 3, which in the practical example is a permanent magnet. The rotor magnet 3 is disposed in a horizontal bearing gap 4 opposite and at a short distance from a stator magnet 5, which also has annular form and has the same dimensions as rotor magnet 3. In the practical example, stator magnet 5 comprises permanent-magnetic material. The action of attractive magnetic force between rotor magnet 3 and stator magnet 5 largely compensates for the weight of rotor 1; slight additionally necessary support for the rotor is not illustrated in the schematic drawing.

Stator magnet 5 is attached to a platform 6, which is mounted on resiliently bendable supports 7 on the fixed stator 8 in such a way that it is rigid in vertical direction but can vibrate compliantly in the horizontal plane. For the resiliently bendable supports 7 in the practical example, there are used metal pins clamped at one end to stator 8, the ends opposite the clamped ends supporting the platform 6, allowing the platform to vibrate freely by motion in the horizontal plane. In the process, the metal pins are resiliently deflected, the movement of supports 7 being marked schematically as bending line 9 in the drawing.

Platform 6 is supported on stator 8 with three supports 7, one of which is shown in the longitudinal section of the magnetic bearing illustrated in the drawing. The metal pins forming the supports are resiliently movable in all radial directions relative to the pin axis, and so platform 6 can vibrate freely in any direction in the horizontal plane oriented parallel to the magnet faces of rotor and stator magnets in horizontal bearing gap 4.

On its surface facing away from stator magnet 5, platform 6 is provided with felt disks 10. In the practical example, three such felt disks are glued to the top side of platform 6, but only one of those felt disks is visible in the longitudinal section of the magnetic bearing illustrated in the drawing. The felt disks 10 are each in contact with a smooth face of a spring, which in the practical example is the surface of one of the broad sides of a leaf spring 11. The contact faces of the felt disks and associated leaf springs have normals to the surface that are oriented perpendicular to the horizontal plane of vibration of stator magnet 5. The leaf springs 11 are fixed to stator 8 in such a way that with their free resilient ends they press in the direction of axis of rotation 2 on the felt disks and control the contact pressure between the smooth surface of the leaf springs and the rough surface of the felt disks. In the practical example, a metal ring 12, the weight of which can be varied to adjust and adapt the contact pressure to the damping force needed in the individual case, is placed on the free end of the leaf spring to reinforce the spring pressure. The frictional force between the contact faces can be adjusted in this way.

A magnetic bearing of such design is substantially stable in radian direction because of the permanent-magnetic field acting in bearing gap 4. Radial vibrations of the rotor during its rotation are absorbed by mechanical friction. For example, during a radial deflection of rotor 1 relative to its axis of rotation 2, platform 6 is moved in horizontal plane of bearing gap 4 because of the magnetic coupling between rotor magnet 3 and stator magnet 5. Radial vibrations of rotor 1 are transmitted to platform 6. In such movement of platform 6, felt disks 10 are also displaced relative to the smooth faces of leaf springs 11, but the sliding movements are braked to a degree dependent on contact pressure between felt disks 10 and leaf springs 11, and thus the movements of rotor 1 are damped.

The assembly volume of the friction device, which comprises the bearing parts platform 6, felt disks 10, leaf springs 11, and possibly metal ring 12 resting thereon and which acts as damping device, is correspondingly small. By using a spring to generate the contact pressure, which in the practical example is also variable by preselecting the weight of metal ring 12, and by virtue of the low cost for the felt disks 10 and leaf springs 11, which are the parts bringing about damping, the friction device as illustrated in the practical example can be made particularly inexpensively. Compared with oil dampers known heretofore, the mass of the parts of the friction device is negligibly small relative to the effective damping force.

What is claimed is:

1. A magnetic bearing for contactless support of a rotor (1) in relation to a stator (8), comprising:

a rotor (1) and a stator (8);

at least one bearing gap (4) between said rotor and stator, in which respective magnetic zones of said rotor and stator (3, 5) are disposed with respective magnetic surfaces facing each other a short distance apart;

wherein the stator magnetic zone is fixed to the stator in such a way that it can vibrate freely in substantially one plane, which is aligned parallel to the magnetic surfaces of said rotor and stator magnetic zones (3, 5) facing each other in the bearing gap (4); and a mechanical friction device (6, 10, 11) disposed between said stator (8) and said stator magnetic zone (5) to damp the vibrational movement of the stator magnetic zone;

wherein the mechanical friction device is provided with two contact faces (10, 11) frictionally connected with each other, with normals to said contact faces being oriented perpendicular to the plane of vibration of the stator magnetic zone (5), one of the contact faces being provided with a smooth surface (11) and the other with a rough surface (10), the rough surface being firmly connected with the stator magnetic zone (5), and the smooth surface being formed by a spring (11), which is fixed in position on the stator (8) but having a resilient part which moves compliantly resiliently in substantially the direction of the normals to the contact faces.

2. A magnetic bearing according to claim 1, wherein the stator magnetic zone (5) is supported on the stator (8) by a resiliently bendable support (7), which is mounted in such a way that it is rigid normal to the bearing gap (4) but is compliantly resilient in a plane of vibration parallel to the bearing gap.

3. A magnetic bearing according to claim 1, characterized in that the frictional force between the contact faces (10, 11) is adjustable with the friction device.

4. A magnetic bearing according to claim 3, characterized in that the frictional force is adjustable through selection of tension with which the spring (11) is made.

5. A magnetic bearing according to claim 1, characterized in that said spring is a leaf spring (11).

6. A magnetic bearing according to claim 5, characterized in that at least part of the tension of the leaf spring (11) is generated by pressure on the resilient part thereof.

7. A magnetic bearing according to claim 1, characterized in that the frictional force between said contact faces is adjustable through selection of tension with which the spring (11) is made.

8. A magnetic bearing, comprising:

a rotor having a first magnetic zone;

a stator;

a platform having a second magnetic zone fixed thereto;

a support fixed to said stator and engaging said platform to maintain a bearing gap between said first and second magnetic zones disposed in respective parallel planes that are perpendicular to an axis of said rotor, said support enabling motion of said second magnetic zone within its respective plane;

a rough surface coupled to said platform; and a resilient member fixed to said stator and biased to slidably engage said rough surface to slide thereacross under a frictional force as said second magnetic zone moves within the plane, wherein said resilient member is a spring.

9. The magnetic bearing of claim 8, wherein tension with which said resilient member is made is selectable to vary the frictional force.

10. The magnetic bearing of claim 8, wherein said rough surface is fixed on said platform.

11. The magnetic bearing of claim 8, wherein said spring is a leaf spring having one end fixed to the stator and a free end sliding across said rough surface under said frictional force.

* * * * *